United States Patent [19]

Biglione et al.

[11] Patent Number: 4,749,745

[45] Date of Patent: Jun. 7, 1988

[54] POLYMERIC BLENDS BASED ON VINYL-AROMATIC POLYMERS

[75] Inventors: Gianfranco Biglione, Mantova; Gian C. Fasulo, San Silvestro di Curtatone, both of Italy

[73] Assignee: Montedison S.p.A., Milan, Italy

[21] Appl. No.: 837,196

[22] Filed: Mar. 10, 1986

Related U.S. Application Data

[63] Continuation of Ser. No. 583,399, Feb. 24, 1984, abandoned.

[51] Int. Cl.$^4$ .......................... C08L 9/06; C08L 9/02; C08L 69/00
[52] U.S. Cl. ............................. 525/146; 525/67; 525/64; 525/175
[58] Field of Search ................... 525/67, 146

[56] References Cited

U.S. PATENT DOCUMENTS

| | | | |
|---|---|---|---|
| 3,130,177 | 4/1964 | Grabowski | 525/67 |
| 3,663,471 | 5/1972 | Schirmer | 525/67 |
| 3,813,358 | 5/1974 | O'Connell | 525/67 |
| 3,852,393 | 12/1974 | Furukawa | 525/67 |
| 3,852,394 | 12/1974 | Kubota | 525/67 |
| 3,880,783 | 4/1975 | Serini | 525/67 |
| 3,891,719 | 6/1975 | Schirmer | 525/67 |
| 3,988,389 | 10/1976 | Margotte | 525/67 |
| 3,989,770 | 11/1976 | Prinz | 525/67 |
| 4,205,141 | 5/1980 | Liebig | 525/67 |

*Primary Examiner*—Patricia A. Short
*Attorney, Agent, or Firm*—Stevens, Davis, Miller & Mosher

[57] ABSTRACT

Polymeric blends containing 20–80% by weight of a modified vinyl-aromatic polymer containing from 5 to 15% by weight of an ethylenically unsaturated nitrile, and 80–20% by weight of at least one resin containing aromatic groups selected from aromatic polycarbonates and crystalline aromatic polyesters.

11 Claims, No Drawings

POLYMERIC BLENDS BASED ON VINYL-AROMATIC POLYMERS

This is a continuation of application Ser. No. 583,399, filed Feb. 24, 1984, now abandoned.

BACKGROUND OF THE INVENTION

1. Field of the Invention

The present invention relates to polymeric blends based on vinyl-aromatic polymers, and more particularly to blends which contain an alkenyl-aromatic resin and are suitable to be transformed into shaped articles by injection molding extrusion or other known processing techniques for thermoplastic polymers.

2. Description of the Prior Art

From British Patent Application No. 2,067,579A are known vinyl-aromatic polymers which possess an improved stress cracking resistance and are particularly suitable to be molded or vacuum shaped.

These vinyl-aromatic polymers modified with rubber are characterized in that they contain from 6 to 12% by weight of an ethylenically unsaturated nitrile, such as acrylonitrile, bound to the two phase system of the polymer, and exhibit the following particular combination of characteristics:

(a) the dispersed elastomeric gel phase insoluble in toluene is not less than 23% by weight;
(b) the swelling index of the elastomeric phase in toluene is greater than 10;
(c) the melt index of the polymer is at least 1.5 g./10 min.;
(d) the bending modulus of the polymer is greater than 15,000 kg/cm$^2$;
(e) the torsional modulus of the polymer is greater than 5,500 kg/cm$^2$;
(f) the notched IZOD impact strength at 23° C. of the polymer is greater than 7 kg.cm/cm.

The methods of measuring the above-mentioned characteristics are described in the Patent Application No. 2 067 579A.

Such modified vinyl-aromatic polymers are particularly suitable to be used in the production both of refrigerator cells and of other articles obtained by thermoforming the extruded sheets. Such polymers can be easily manufactured by processes which are presently in use. Furthermore, they are compatible both with polystyrol or impact resistant polystyrol, as well as with ABS thermopolymers and styrol/acrylonitrile copolymers (SAN).

Nevertheless, these vinyl-aromatic polymers modified with an ethylenically unsaturated nitrile, and also in general all vinyl-aromatic polymers, have the drawback of having a low heat distorsion temperature so that their thermal resistance is not sufficiently satisfactory to meet the necessary requirements in some fields of application, for example in the automotive industry.

SUMMARY OF THE INVENTION

The present invention aims to improve the thermal resistance of vinyl-aromatic polymers modified with an ethylenically unsaturated nitrile, without altering and preferably improving their chemical-physical properties.

According to the present invention, there is provided a polymeric blend containing:
from 20 to 80% by weight, with respect to the blend, of a modified vinyl-aromatic polymer containing from 5 to 15% by weight of an ethylenically unsaturated nitrile;
from 80 to 20% by weight, with respect to the blend, of at least one resin containing aromatic groups selected from:

(a) an aromatic polycarbonate having repeating structural units of the formula:

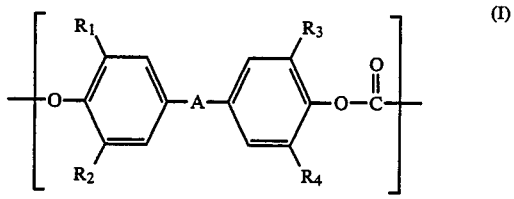

in wich

R$_1$, R$_2$, R$_3$ and R$_4$ each represents hydrogen or an alkyl radical containing from 1 to 3 carbon atoms, and A represents —O—, —CO—, —SO$_2$—, an alkylene radical containing from 1 to 10 carbon atoms, an alkylidene radical containing from 1 to 10 carbon atoms, a cyclo-alkylene radical containing from 5 to 15 carbon atoms, a cyclo-alkylidene radical containing from 5 to 15 carbon atoms or the radical:

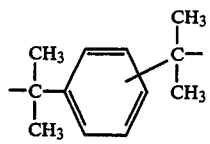

and (b) a crystalline aromatic polyester obtained by polymerization of a glycol of general formula:

$$HO—(CH_2)_n—OH \quad (II)$$

in which n is an integer from 2 to 10, with a bicarboxylic acid of formula:

$$HOOC—R_5—B—R_6—COOH \quad (III)$$

in which R$_5$ and R$_6$ each represents —(CH$_2$)$_m$ where m is zero or an integer from 1 to 4 and B is a bivalent aromatic radical represented by:

in which D may be:

—(CH$_2$)$_p$—; —(CH$_2$)$_p$—CO—(CH$_2$)$_p$—; —(CH$_2$)$_p$—O—(CH$_2$)$_p$—; —O—(CH$_2$)$_q$—O—;

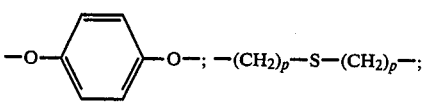

-continued

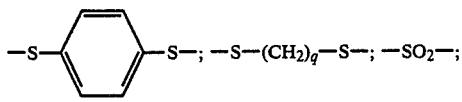

where p may be zero or an integer from 1 to 5 and q is an integer from 1 to 5.

The term vinyl-aromatic polymer as used herein is to be understood to include any solid thermoplastic polymer and respective copolymer, essentially consisting of (i.e. containing chemically bound) at least 50% by weight of one or more vinyl-aromatic compounds of general formula:

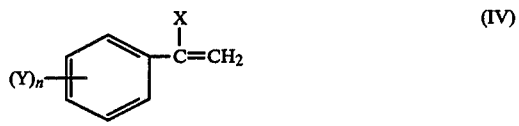

in which X represents hydrogen or an alkyl radical having from 1 to 4 carbon atoms; Y represents a halogen or an alkyl radical having from 1 to 4 carbon atoms; and n is zero or an integer from 1 to 5.

Examples of vinyl-aromatic compounds having the formula (IV) are: styrene; methyl styrene; mono-, di-, tri-, tetra-, and penta-chloro-styrene and the respective alpha-methyl-styrenes; styrenes alkylated in the nucleus and the respective alpha-methyl-styrenes such as ortho- and para-methyl-styrenes and ortho- and para-ethyl-styrenes; and ortho- and para-alpha-methyl-styrenes. These monomers may be used alone or in admixture with each other.

The term vinyl-aromatic polymers also includes polystyrenes modified with rubbers, which are generally employed to render the polymers impact-resistant.

The rubbers which are generally used for this purpose are polybutadiene, polyisoprene, copolymers of butadiene and/or of isoprene with styrene or with other monomers, having a glass transition temperature (Tg) lower than $-20°$ C., or the saturated rubbers such as ethylene-propylene rubbers, ethylene-propylene-diene terpolymers, and siliconic rubbers with unsaturated groups.

The vinyl-aromatic polymers contain from 5 to 15%, and preferably less than 10% by weight, of an ethylenically unsaturated nitrile such as acrylonitrile or methacrylonitrile.

The aromatic polycarbonates containing the repeating structural units (I) are well known in the art and are commercially available from different sources, for example General Electric Company, Pittsfield, Mass., USA under the Trade Mark "LEXAN"; or from ANIC of S. Donato Milanese, Milan, Italy under the Trade Mark "SINVET".

Generally any aromatic polycarbonate may be used; however those obtained from bisphenol A are particularly preferred. Bisphenol A is 2,2-bis-(4-hydroxyphenyl)-propane, available on the market as "Sinvet" and "Lexan". The polycarbonates employed in the composition of the present invention suitably have a molecular weight $\overline{M}_w$ ranging from 10,000 to over 200,000, more preferably from 20,000 to 60,000.

The crystalline polyesters are well known in the art and are commercially available from different sources.

Representative examples of crystalline polyesters obtained by polymerization of a glycol (II) with a bicarboxylic acid (III) are: polyethylene-terephthalate, polybutene-terephthalate, and polyethylene-2,2'-diphenoxy-ethane-4,4'-dicarboxylate.

These crystalline polyesters preferably have a molecular weight ranging from 10,000 to 60,000.

The polymeric blends of the present invention can be prepared in different ways, for example by single screw or double-screw extrusion and subsequent granulation, or by mastication in a Banbury mixer and subsequent cube shaping by means of a calender.

To the blends may be added optional additives such as antistatic agents, flame proofing agents, lubricating agents, coloring agents, physical and chemical expanding agents such as Freon, pentane, or azodicarbonamide. The blend can be also reinforced by glass fibers or synthetic fibers. "FREON" is a Registered Trade Mark.

The invention will be further described with reference to the following illustrative Examples. In the Examples all the parts are expressed by weight, unless indicated otherwise.

The properties of the blends of the present invention have been tested on test pieces molded by injection, by using the following methods:
1. The heat distortion temperature (HDT) was determined according to the standard ASTM D 648, at 66 psi and at 264 psi.
2. The Vicat softening point procedure A was determined according to the standard ASTM D 1525.
3. The IZOD impact strength was determined at 23° C. according to the standard ASTM D 256, by using test pieces of size $\frac{1}{2}'' \times \frac{1}{8}''$ (1.27 cm$\times$0.32 cm).
4. The tests for the resistance against Freon (ESC) were carried out on test pieces subjected to creep in a tensile test, maintaining their central part, for a 40 mm stretch, in contact with liquid Freon 11. For this purpose, a glass container containing Freon 11 was fixed, by means of a rubber gasket, to the lower end of the vertically arranged test piece, in correspondence with its wider stretch. The test piece was subjected to a load of 100 Kg/cm$^2$ and the time necessary for the rupture of the same was measured.

EXAMPLES 1–4

By means of a single screw extruder BANDERA TR 45, having a length/diameter ratio=30, there were extruded with degasification and at the temperature given in Table I, blends consisting of:

a modified vinyl-aromatic polymer having the following composition: 72% by weight of styrene, 12% by weight of alpha-methyl-styrene, 8% by weight of acrylonitrile and 8% by weight of rubber;

an aromatic polycarbonate, "SINVET 221", sold by ANIC of S. Donato Milanese, Milan, Italy, in the amount given in Table I; and 0.05% by weight of a sterically hindered phenolic antioxidant, IRGANOX 1076.

By cutting the filaments coming from the extruder, granules were obtained which were dried at 90° C. for two hours. The granules were molded by injection, at a temperature that was 20° C. higher than the lowest filling temperature of the mold impression, on a NEGRI & BOSSI V-17-110 FA press, and thus test pieces were obtained.

The properties of the thus obtained test pieces are given in the following Table I.

TABLE I

| Example No. | 1 | 2 | 3 | 4 |
|---|---|---|---|---|
| Vinyl-aromatic polymer | 100 | 70 | 50 | 30 |
| Polycarbonate "SINVET" (parts by weight) | 0 | 30 | 50 | 70 |
| Extrusion temperature of the blend (°C.) | 210 | 250 | 250 | 260 |
| Lowest filling temperature of the mold impression for injection of the test pieces (°C.) | 190 | 220 | 240 | 260 |
| HDT | | | | |
| at 66 psi (°C.) | 97 | 107 | 115 | 125 |
| at 265 psi (°C.) | 89 | 96 | 105 | 119 |
| VICAT A | | | | |
| at 1 kg. in oil (°C.) | 107 | 118 | 129 | 140 |
| at 5 kg. in oil (°C.) | 98 | 108 | 119 | 130 |
| IZOD impact strength (J/m) | 70 | 250 | 400 | 590 |
| E.S.C. in Freon 11 (hours) | 2 | 20 | 50 | 70 |

EXAMPLES 5-8

Following the procedures of Example 1, test pieces were prepared by using blends consisting of:
a modified vinyl-aromatic polymer consisting of 84% by weight of styrene, 8% by weight of acrylonitrile, and 8% by weight of rubber; and
an amount given in Table II of a polybutyleneterephthalate, "PIBITER N 100", of Montedison S.p.A.

The properties of the obtained test pieces are given in Table II.

TABLE II

| Example No. | 5 | 6 | 7 | 8 |
|---|---|---|---|---|
| Vinyl-aromatic polymer | 100 | 75 | 50 | 25 |
| Polybutyleneterephthalate "PIBITER N 100" (parts by weight) | 0 | 25 | 50 | 75 |
| Extrusion temperature of the blend (°C.) | 200 | 230 | 230 | 240 |
| Lowest filling temperature of the mold impression for injection of the test pieces (°C.) | 175 | 195 | 220 | 225 |
| HDT | | | | |
| at 66 psi (°C.) | 94 | 95 | 94 | 105 |
| at 264 psi (°C.) | 84 | 83 | 79 | 72 |
| VICAT A | | | | |
| at 1 kg. in oil (°C.) | 90 | 92 | 99 | 126 |
| at 5 kg. in oil (°C.) | | | | |
| IZOD impact strength (J/m) | 80 | 49 | 50 | 55 |
| E.S.C. in Freon 11 (hours) | 1 | 20 | 150 | 170 |

What we claim is:

1. A polymeric blend containing:
from 20 to 80% by weight, with respect to the blend, of a vinyl-aromatic polymer containing about 8% by weight of a butadiene rubber having a glass transition temperature of less than $-20°$ C. and containing from 5 to 15% by weight of an ethylenically unsaturated nitrile; from 80 to 20% by weight, with respect to the blend, of an aromatic polycarbonate having repeating structural units of the formula:

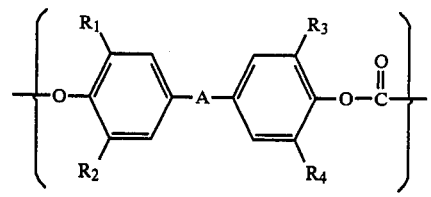

in which $R_1$, $R_2$, $R_3$, and $R_4$ each represents hydrogen or an alkyl radical containing from 1 to 3 carbon atoms, and A represents $-O-$, $-CO-$, $-SO_2$, an alkylene radical containing from 1 to 10 carbon atoms, an alkylidene radical containing from 1 to 10 carbon atoms, a cyclo-alkylene radical containing from 5 to 15 carbon atoms, a cyclo-alkylidene radical containing from 5 to 15 carbon atoms or the radical:

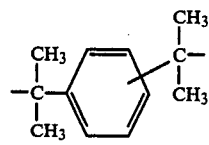

and wherein the vinyl-aromatic polymer contains at least 50% by weight of one or more vinyl-aromatic compounds of the formula

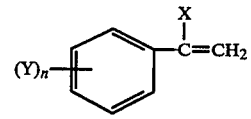

in which X is hydrogen or $C_1$–$C_4$ alkyl; Y is a halogen or $C_1$–$C_4$ alkyl; and n is zero or an integer from 1 to 5.

2. A polymeric blend according to claim 1, in which the ethylenically unsaturated nitrile is acrylonitrile.

3. A polymeric blend according to claim 1, in which the content of ethylenically unsaturated nitrile in the modified vinyl-aromatic polymer is less than 10% by weight.

4. A polymeric blend according to claim 2, in which the content of acrylonitrile is less than 10% by weight.

5. A polymeric blend according to claim 1, in which the polycarbonate is obtained from bisphenol.

6. A polymeric blend consisting essentially of from 20 to 80% by weight, with respect to the blend, of a vinyl-aromatic polymer containing about 8% by weight of a butadiene rubber having a glass transition temperature of less than $-20°$ C. and containing from 5 to 15% by weight of an ethylenically unsaturated nitrile, and from 80 to 20% by weight, with respect to the blend, of an aromatic polycarbonate having repeating structural units of the formula:

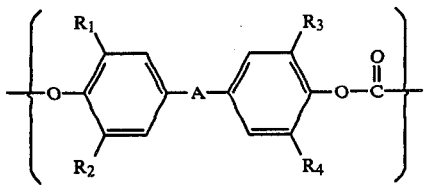

in which $R_1$, $R_2$, $R_3$, and $R_4$ each represents hydrogen or an alkyl radical containing from 1 to 3 carbon atoms, and A repesents —O—, —CO—, —SO$_2$—, an alkylene radical containing from 1 to 10 carbon atoms, an alkylidene radical containing from 1 to 10 carbon atoms, a cyclo-alkylene radical containing from 5 to 15 carbon atoms, a cyclo-alkylidene radical containing from 5 to 15 carbon atoms or the radical:

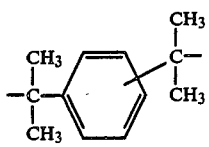

and wherein the vinyl-aromatic polymer contains at least 50% by weight of one or more vinyl-aromatic compounds of the formula

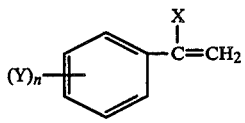

in which X is hydrogen or $C_1$–$C_4$ alkyl; Y is a halogen or $C_1$–$C_4$ alkyl; and n is zero or an integer from 1 to 5.

7. A polymeric blend according to claim 6, in which the ethylenically unsaturated nitrile is acrylonitrile.

8. A polymeric blend according to claim 7, in which the content of acrylonitrile is less than 10% by weight.

9. A polymeric blend according to claim 6, in which the content of ethylenically unsaturated nitrile in the modified vinyl-aromatic polymer is less than 10% by weight.

10. A polymeric blend according to claim 6, in which the aromatic polycarbonate is obtained from bisphenol A.

11. A polymeric blend containing from 20% to 80% by weight with respect to the blend of a vinyl aromatic polymer containing from 5 to 15% by weight of an ethylenically unsaturated nitrile selected from the group consisting of acrylonitrile and methacrylonitrile about 8% by weight of a butadiene rubber having a glass transition temperature lower than −20° C., for rendering the polymer impact-resistant, and from 80 to 20% by weight of an aromatic polycarbonate having repeating structural units of the formula

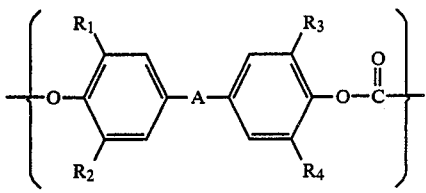

in which $R_1$, $R_2$, $R_3$, and $R_4$ each represents hydrogen or an alkyl radical containing from 1 to 3 carbon atoms, and A represents —O—, —CO—, —SO$_2$—, an alkylene radical containing from 1 to 10 carbon atoms, an alkylidene radical containing from 1 to 10 carbon atoms, a cyclo-alkylene radical containing from 5 to 15 carbon atoms, a cyclo-alkylidene radical containing from 5 to 15 carbon atoms or the radical

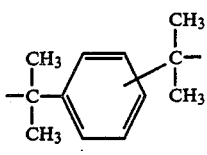

and wherein the vinyl-aromatic polymer contains at least 50% by weight of one or more vinyl-aromatic compounds of the formula

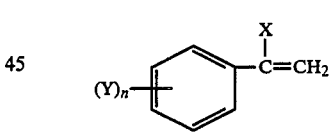

in which X is hydrogen or $C_1$–$C_4$ alkyl; Y is a halogen or a $C_1$–$C_4$ alkyl; and n is zero or an integer from 1 to 5.

* * * * *